United States Patent [19]

Watanabe

[11] Patent Number: 5,472,799
[45] Date of Patent: Dec. 5, 1995

[54] SOLID POLYMER ELECTROLYTE FUEL CELL

[75] Inventor: Masahiro Watanabe, No. 2412-8, Wadamachi, Kofu-shi, Yamanashi, Japan

[73] Assignees: Tanaka Kikinzoku Kogyo K.K.; Masahiro Watanabe, both of Japan; Stonehart Associates Inc., Madison, Conn.

[21] Appl. No.: 125,637

[22] Filed: Sep. 22, 1993

[30]    Foreign Application Priority Data

Sep. 22, 1992 [JP] Japan .................... 4-277959

[51] Int. Cl.$^6$ ................................. H01M 8/10
[52] U.S. Cl. ....................... 429/30; 429/33
[58] Field of Search ........................ 429/30, 33

[56]          References Cited

U.S. PATENT DOCUMENTS 5,234,777  8/1993  Wilson ........................ 429/33
5,242,764  9/1993  Dhar ........................... 429/30
5,246,792  9/1993  Watanabe ..................... 429/33
5,272,017  12/1993  Suathirajan et al. ........... 429/33

FOREIGN PATENT DOCUMENTS 228602  7/1987  European Pat. Off. .
483085  4/1992  European Pat. Off. .

*Primary Examiner*—Stephen Kalafut
*Attorney, Agent, or Firm*—Klauber & Jackson

[57]          ABSTRACT

Disclosed is a solid polymer electrolyte fuel cell which contains a catalyst impregnated layer in an ion exchange membrane which is electrically isolated but ion conductive. In place of the catalyst layer, catalyst particles existing in an anode and/or a cathode may be employed. The catalyst layer and the catalyst particles are attributable to the prevention of the lowering of a cell voltage and the employment of an inexpensive hydrocarbon ion exchange membrane and of a thin membrane.

2 Claims, 1 Drawing Sheet

U.S. Patent
Dec. 5, 1995
5,472,799
FIG. 1
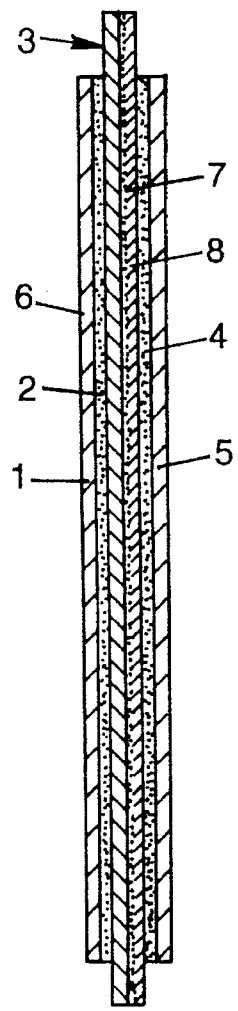
FIG. 3
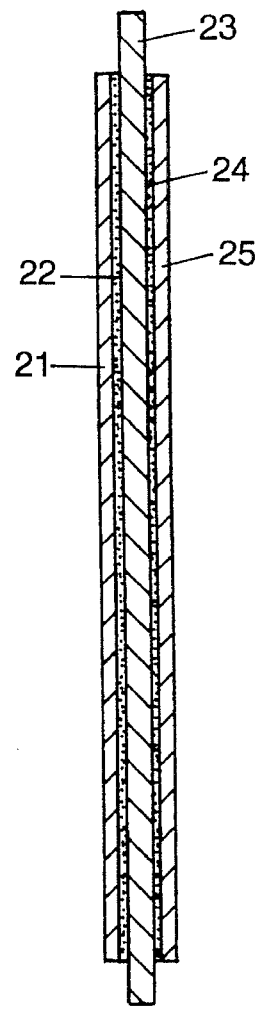
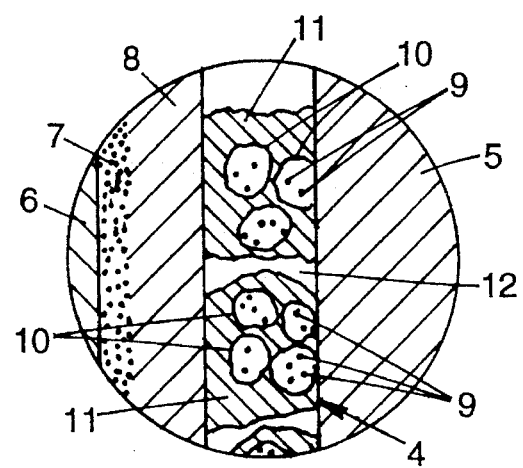
FIG. 2
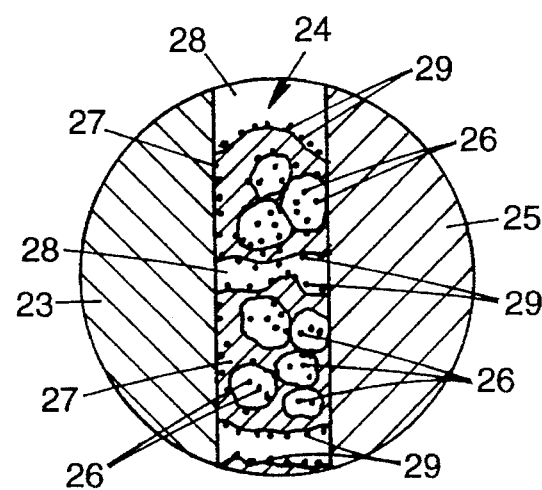
FIG. 4

SOLID POLYMER ELECTROLYTE FUEL CELL

BACKGROUND OF THE INVENTION

The present invention relates to a solid polymer electrolyte fuel cell which prevents the lowering of a cell voltage by eliminating the crossover of a reactant gas and a liquid and enables the employment of a hydrocarbon ion exchange membrane which is inexpensive and has a low resistance.

A solid polymer electrolyte fuel cell attracts more attention as an electronic power source of an electric automobile and a space craft compared with a phosphoric acid fuel cell because it is compact and may take out high current density.

The electrode structure of a conventional fuel cell is ordinarily a five-layered sandwich structure which consists of a cathode current collector, a cathode, a solid polymer electrolyte (ion exchange membrane), an anode and an anode current collector. A hydrogen gas and an oxygen gas are supplied to and diffuse into an anode and a cathode, respectively, and as result an anode potential and a cathode potential deviate from a normal oxidation reduction potential so as to lower a cell voltage if the thickness of the membrane is thin. The lowering of the cell voltage due to the crossover of the gases has been conventionally prevented by depressing the permeation of the gases in the membrane by means of making the membrane thickness more than a certain value (about 100 μm).

However, inconveniently, the resistance increases and the current density obtained decreases when the membrane thickness is thick.

A perfluorocarbon membrane of a sulfonic acid type or a carboxylic acid type which is chemically stable is employed as the ion exchange membrane of a fuel cell. This is because of the deterioration of the cheap hydrocarbon ion exchange membrane due to oxidative decomposition caused by a radical generated in a cathode reaction. Since the chemically stable perfluorocarbon type ion exchange membrane possesses a large molecular weight, an equivalent weight (EW) per unit functional group is large so that ionic conductivity decreases and a resistance increases. In the other words, the conventional fuel cell has the drawbacks that the ionic conductivity is large and the lowering of the resistance by employing the cheap hydrocarbon ion exchange membrane cannot be attained as well as the membrane thickness cannot be made thin to lower the resistance in the case of employing the perfluorocarbon type membranes.

SUMMARY OF THE INVENTION

In view of the above drawbacks, an object of the present invention is to provide a solid polymer electrolyte fuel cell which prevents the lowering of a cell voltage produced by the crossover of a gas occurring through a membrane of the fuel cell and which enables the employment of a thin membrane whose thickness is less than 100 μm and of even a hydrocarbon ion exchange membrane which is inexpensive and has high ionic conductivity though its chemical stability is low.

The present invention is firstly a solid polymer electrolyte fuel cell comprising a cathode current collector, a cathode, an ion exchange membrane having a catalyst layer, an anode and an anode current collector which are piled in this turn and the catalyst layer being electronically insulated but being ionically connected, and is secondly a sandwich-type solid polymer electrolyte fuel cell comprising a cathode current collector, a cathode, an ion exchange membrane, an anode and an anode current collector which are piled in this turn, the anode and/or the cathode being formed by colonies which are prepared by coating ion exchange resin on the surface of catalyst particles supported on catalyst supports and the respective colonies and the current collectors being electronically connected, wherein the catalyst particles in the cathode and/or the anode are disposed in the state of electronic insulation and ionic conduction.

The fuel cell of the invention thus constituted can depress the decrease of the cell voltage to enable the effective operation by reacting the hydrogen gas and the oxygen gas moving in the ion exchange membrane in the opposite direction to the opposite electrodes to convert them into water. Since, further, the radical which is likely to deteriorate the hydrocarbon ion exchange membrane having the lesser durability can be diminished by means of the isolated catalyst layer, the hydrocarbon ion exchange membrane which is inexpensive and has a small internal resistance can be employed.

When the isolated catalyst layer is located nearer to the cathode side in the ion exchange membrane, the fuel cell having the ion exchange membrane with the small internal resistance can be provided maintaining the durability. This may be attained by making the said isolated catalyst layer existing between the high ion conductive hydrocarbon ion exchange membrane and the perfluorocarbon ion exchange membrane which is resistant to the cathode reaction.

In the present invention, in place of the catalyst layer existed in the ion exchange membrane, the catalyst metals can be supported near the surface of the ion exchange membrane in the cathode or the anode in the state of the electronic disconnection from the current collector. Also in the fuel cell in accordance with the present invention thus constituted, the same effects can be attained in the fuel cell having the catalytic layer in the ion exchange membrane.

BRIEF DESCRIPTION OF DRAWINGS

FIG. 1 is a longitudinal section showing one embodiment of a solid polymer electrolyte fuel cell in accordance with the present invention;

FIG. 2 is an partial enlarged view of FIG. 1;

FIG. 3 is a longitudinal section showing another embodiment of a solid polymer electrolyte fuel cell in accordance with the present invention;

FIG. 4 is an partial enlarged view of FIG. 3.

DETAILED DESCRIPTION OF THE INVENTION

The reasons why the catalytic layer which is electronically insulated is formed in the ion exchange membrane or the catalyst metal which is electronically insulated is supported in the electrode structure of the cathode and/or the anode are, firstly, to depress the lowering of the cell voltage which may occur by the crossover of a hydrogen gas and an oxygen gas to the respective opposite electrodes by converting the hydrogen gas and the oxygen gas penetrating towards the respective electrodes in the ion exchange membrane into water by means of a reaction with the catalytic layer, and secondly, to protect the ion exchange membrane by converting a radical which is likely to be generated in the cathode side and is likely to oxidatively deteriorate the ion exchange membrane, into an inactive substance. The internal resistance can be decreased without the decrease of the cell voltage by enabling the employment of the hydrocarbon ion exchange membrane having a small equivalent weight and high ionic conductivity in place of the perfluorocarbon type ion exchange membrane conventionally employed having a large equivalent weight and low ionic conductivity.

Although the thermally and chemically stable perfluorocarbon type ion exchange membrane having a sulfonic acid or a carboxylic acid has been generally employed for a fuel cell, the stable hydrocarbon ion exchange membrane having a sulfonic acid or a carboxylic acid or a composite membrane having the both of the perfluorocarbon ion exchange membrane and the hydrocarbon ion exchange membrane may be preferably employed. The ion exchange membrane employed in the fuel cell of the present invention may be any ion exchange membrane having an ion exchange group.

The catalyst layer formed in the ion exchange membrane may be composed of catalyst particles which promote the reaction between fuel (a hydrogen gas, methanol and the like) and an oxidizing agent (oxygen, hydrogen peroxide and the like). The catalyst layer is desirably formed in the ion exchange membrane in the form of a membrane perpendicular to a direction of gas permeation so that the catalyst layer can get in contact with the hydrogen gas and the oxygen gas as much as possible to produce water. After, for example, the catalyst layer is formed on one of the two ion exchange membranes by supporting the catalyst particles of desired thickness by means of a thermal decomposition method or the like, the two membranes interposing the catalyst layer therebetween are integrated by means of hotpressing or the like to make the ion exchange membrane of the present invention.

For the fear of the deterioration of the ion exchange membrane of the cathode side by means of a radical generated by the cathode reaction, the partial ion exchange membrane from the catalyst layer to the cathode side surface is preferably one having a chemical stability which may be a relatively large equivalent weight. Since the partial membrane from the catalyst layer to the anode side surface is not contact in the radical, the membrane which possesses a lower equivalent weight and a lesser chemical stability may be employed, thereby the decrease of the internal resistance can be attained. The anode and the cathode which are not sufficiently humidified may be positively humidified by means of the water produced.

As the electrode particles composing the anode and the cathode, particles which is conventionally prepared by supporting such a catalyst metal as platinum on carbon particles can be employed without further processing. All electrode particles are not necessarily supported with the catalyst, they may be a mixture of the catalyst-supporting particles and the catalyst-non-supporting particles. Further, the electrode catalyst particles may be coated with ion exchange resin to facilitate the proton transfer in the catalyst electrode as well as to elevate the affinity with the ion exchange membrane.

When the catalyst is disposed in the electrode in this invention, the catalyst metal is supported near the surface of the ion exchange resin. For preparing the fuel cell supported with the catalyst metal, the piled body of a cathode current collector, a cathode, an ion exchange membrane, an anode and an anode current collector prepared according to an ordinary method is dipped in an aqueous solution of a platinum amino salt to ion-exchange the exchange groups of the ion exchange resin in the electrodes with the platinum cation, and then the catalyst metal is supported in the vicinity of the surface by reducing the platinum ion by means of such a reducing agent as hydrazine. The catalyst metal thus supported is electronically insulated from the current collector because of the ion exchange resin interposed.

The current collector is not especially restricted, and a carbon sheet, a sintered sheet made of metal particles and a carbon or metal mesh can preferably be employed. The current collector and the electrode are desirably integrated by means of hotpressing, coldpressing or the like prior to the fastening.

These respective members are, as mentioned earlier, piled in the turn of the cathode current collector, the cathode, the ion exchange membrane, the anode and the anode current collector and fastened and integrated by means of the hotpressing or a pair of fastening plates located at the both sides. The fastening is desirably performed employing the both fastening plates and bolts penetrating the ion exchange membrane. In addition, these members may be fixed to each other by means of an elastic body surrounding them.

As mentioned earlier, the fuel cell of the invention thus constituted can attain, by means of the catalyst layer existing in the ion exchange membrane or the catalyst metals in the electrode, the prevention of the lowering of the cell voltage due to the crossover of the gases, the thinning of the ion exchange membrane, the employment of the inexpensive and highly ionic conductive hydrocarbon ion exchange membrane and the decrease of the internal resistance of the ion exchange membrane.

Referring now to FIGS. 1 and 2, this fuel cell is constituted by an anode current collector 1, an anode 2, an ion exchange membrane 3, a cathode 4 and a cathode current collector 5 which are piled in this turn from the left. The ion exchange membrane 3 is constituted by an anode side ion exchange membrane 6 which is thick, relatively excellent in the ionic conductivity and inferior in the chemical resistance, a cathode side ion exchange membrane 8 which is inferior in the ionic conductivity to and superior in the chemical resistance to the anode side ion exchange membrane 6 and a catalyst layer 7 formed on the all surface of the cathode side ion exchange membrane 8 opposite to the cathode current collector 5, the layer 7 being admixed with the ion exchange membrane 8. The cathode 4 consists of a plurality of colonies which have been prepared by coating catalyst particles 10 with perfluorocarbon type ion exchange resin 11. The catalyst particles 10 are such supports such as carbon particles supporting a catalyst metal 9 such as platinum. Cavities 12 are formed among the colonies. The catalyst particles 10 are connected through the carbon supports to the current collector 5 and the catalyst layer 7 is electronically insulated from the current collectors 1 and 5.

The catalyst layer 7 which is located nearer to the cathode 4 than to the anode 2 is in contact with a radical which may be generated on the cathode 4 and a hydrogen gas to covert them into an inactive substance and water so that the ion exchange membrane 3 can be protected. Further, it promotes the reaction between the hydrogen gas and the oxygen gas which crossover in the ion exchange membrane 3 to convert them into water to prevent the lowering of the cell voltage.

Referring now to FIGS. 3 and 4, the fuel cell shown therein is constituted by an anode current collector 21, an anode 22, an ion exchange membrane 23, a cathode 24 and a cathode current collector 25 which are piled in this turn from the left. The cathode 24 consists of a plurality of colonies which have been prepared by coating catalyst particles 26 with perfluorocarbon type ion exchange resin 27. The catalyst particles 26 are supports such as carbon particles supporting a catalyst metal 29 such as are supported in the colonies of the ion exchange resin 27. The catalyst particles 26 supported on the supports are electronically connected through the carbon supports to the current collector 25 and the catalyst particles 26 supported in the colonies are electronically insulated from the current collectors 21 and 25.

The catalyst metals 29 are preferably disposed in the cathode 24 rather than in the anode 22 so as to catalytically react a radical which may be generated on the cathode 24 with a hydrogen gas diffused from the anode to convert them into an inactive substance and water for protecting the ion exchange membrane 23. Further, it prevents the lowering of the cell voltage by promoting the reaction between the hydrogen gas and the oxygen gas which crossover in the ion exchange membrane 23 to convert them into water to prevent the lowering of the cell voltage.

EXAMPLES

Although Examples of the fuel cell in accordance with the present invention will be illustrated, these are not construed to restrict the invention.

EXAMPLE 1

After 10 g of carbon powder was impregnated with a chloroplatinic acid aqueous solution (platinum concentration: 150 g/liter), a platinum-carbon catalyst of which a platinum support amount was 30% in weight was prepared by thermal decomposition treatment. The carbon catalyst was impregnated with a commercially available ion exchange resin dispersion solution [(Nafion (trademark of Du Pont) solution] and then dried to form an ion exchange resin layer on the surface. The catalyst powder was fractionated so that the average platinum supporting amount became 0.3 mg/cm$^3$, and the fractionated powder was then redispersed in alcohol.

Then, the dispersion was filtered under weak suction to adhere the catalyst powder on a filter paper of which a diameter was 50 cm with a small amount of the alcohol remaining on the filter paper. The filter paper was hotpressed at 130° C. and 5 kg/cm$^2$ with a hydrophobically treated carbon paper of which a diameter was 20 cm and a thickness was 360 μm functioning as a current collector to prepare an electrode equipped with the current collector having a cathode or anode on one surface.

On the other hand, a platinum layer was formed by means of sputtering on a hydrocarbon ion exchange membrane of the anode side having a thickness of 50 μm and an EW value of 900.

A commercially available perfluorocarbon type ion exchange resin solution (Nafion solution) was applied on the catalyst layer of the anode side ion exchange membrane and dried at 60° C. to from an ion exchange membrane having the catalyst layer of which a total thickness was 60 μm.

The anode, the ion exchange membrane and the cathode were piled and on the both sides thereof were placed a pair of fastening plates having bolt apertures on the four corners. A fuel cell was constituted by inserting four bolts into the respective apertures and fixing the bolts with nuts.

The cell voltage of this fuel cell was measured under the following conditions. Supply gases to the anode and the cathode were humidified hydrogen and non-humidified oxygen of one atmospheric pressure, respectively, and an open circuit voltage and a voltage at a current density of 1 A/cm$^2$ were measured at 80° C. Both of the initial open circuit voltage and that after 10 hours were about 1020 mV. The initial cell voltage and that after 100 hours at 1 A/cm$^2$ were 620 to 640 mV.

It can be seen from these values that the cell voltage remains stable over 100 hours from the beginning of the operation.

COMPARATIVE EXAMPLE 1

A fuel cell was constituted in the same manner as that of Example 1 except that the catalyst layer was not formed and the cell voltage was measured under the same conditions of Example 1. The initial open circuit cell voltage and that after 100 hours were 820 mV and 810 mV, respectively, and those at a current density of 1 A/cm$^2$ were 615 mV and 220 mV.

It can be seen by comparing the cell voltages of Example 1 and Competitive Example 1 that the considerable lowering of the cell voltage probably due to the crossover of the hydrogen gas and the oxygen gas and to the deterioration of the membrane occurred in Comparative Example 1.

EXAMPLE 2

After the piled members of the cathode current collector, the cathode, the ion exchange membrane, the anode and the anode current collector constituted in the same manner as that of Comparative Example 1 were impregnated in a platinum ammine salt aqueous solution (platinum concentration: 0.3 g/liter), the salt was reduced by means of hydrazine to support, in the cathode, platinum which was a catalyst metal electronically connected to the current collector and platinum which was another catalyst metal electronically disconnected to the current collector.

The cell voltages of this fuel cell were measured under the same conditions as those of Example 1. The initial open circuit cell voltage and that after 100 hours were about 1013 mV, and those at a current density of 1 A/cm$^2$ were 610 to 655 mV.

It can be seen from these values that the cell voltage remains stable over 100 hours from the beginning of the operation.

What is claimed is:

1. A solid polymer electrolyte fuel cell comprising a cathode current collector, a cathode connected to the cathode current collector, an ion exchange membrane having a catalyst layer; an anode and an anode current collector connected to the anode, the catalyst layer being electronically insulated from the current collectors.

2. The fuel cell as claimed in claim 1, wherein the catalytic layer in the ion exchange membrane is located nearer to the cathode than to the anode.

* * * * *